United States Patent [19]

Verheijen

[11] Patent Number: 4,791,860

[45] Date of Patent: Dec. 20, 1988

[54] EQUIPMENT FOR SUPPLYING HOT WATER

[75] Inventor: Jan J. Verheijen, Heiloo, Netherlands

[73] Assignee: Verheijen, B.V., Heerhugowaard, Netherlands

[21] Appl. No.: 44,705

[22] Filed: May 1, 1987

[30] Foreign Application Priority Data

May 1, 1986 [NL] Netherlands .................. 8601122

[51] Int. Cl.$^4$ .................. A23F 3/00; A23F 5/00; A47J 31/00; A47J 31/56
[52] U.S. Cl. .................. 99/323.3; 99/275; 99/304; 99/483
[58] Field of Search .................. 99/275, 323.1, 323.3, 99/325, 485–487, 516, 534, 536, 483

[56] References Cited

U.S. PATENT DOCUMENTS 3,634,107  1/1972  Cornelius .

FOREIGN PATENT DOCUMENTS 625857   2/1936  Fed. Rep. of Germany .
2434336  1/1976  Fed. Rep. of Germany .
158067   10/1968 Netherlands .
6807264  11/1968 Netherlands .
79045027 6/1979  Netherlands .
8603534  7/1981  Netherlands .

Primary Examiner—Timothy F. Simone
Attorney, Agent, or Firm—Cushman, Darby & Cushman

[57] ABSTRACT

Equipment for supplying a quantity of hot water, for example for preparing hot drinks, provided with a heating unit for bringing the quantity of water to a predetermined temperature, the inlet of which is connected via an intake pipe and via an intake valve to a cold water pipe and the outlet of which is connected to a discharge pipe, means for supplying a further quantity of water which is not brought to the predetermined temperature by the heating unit, which further quantity is dependent on the desired temperature of the total quantity of water to be supplied, temperature-selection means for selecting the desired temperature, which temperature-selection means supply a temperature-selection signal to a control unit, said control unit furthermore receiving a quantity-selection signal from quantity-selection means and supplying control signals to the intake valve and to the heating unit. The control unit functions in such a way that sequentially said quantity of water at said predetermined temperature and said further quantity of water of lower temperature are supplied.

11 Claims, 4 Drawing Sheets

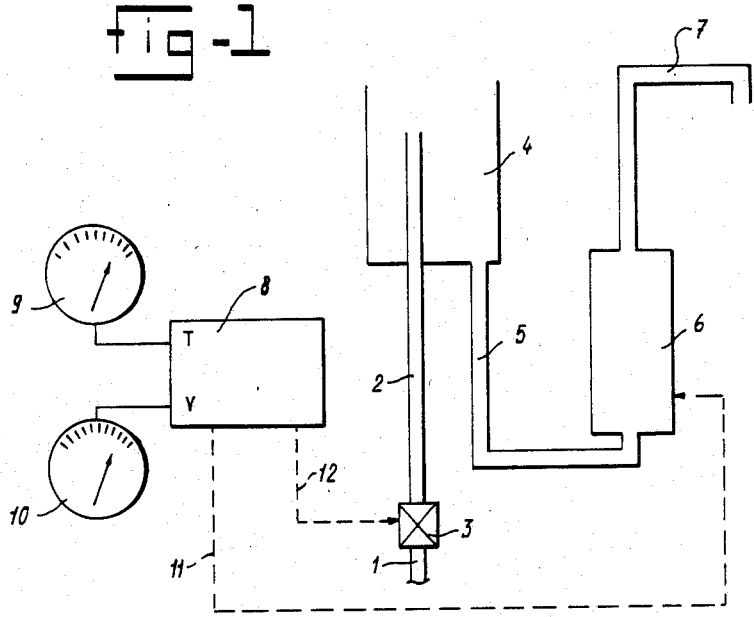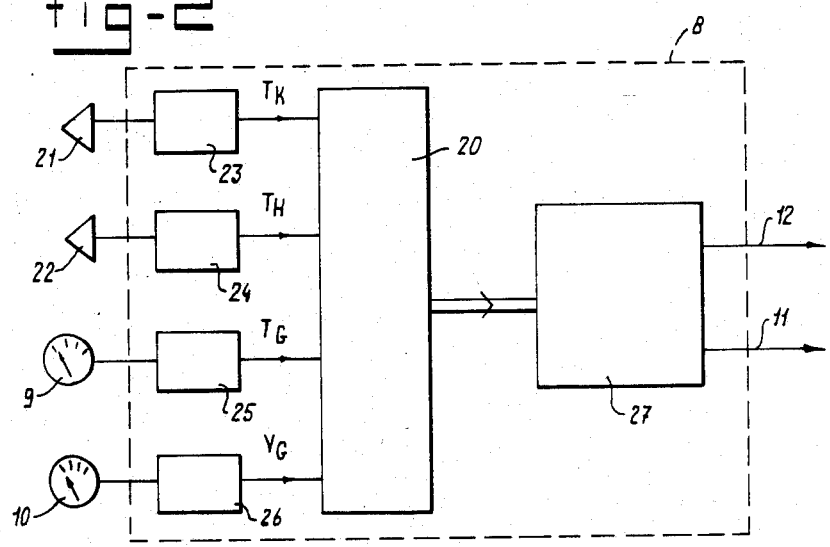

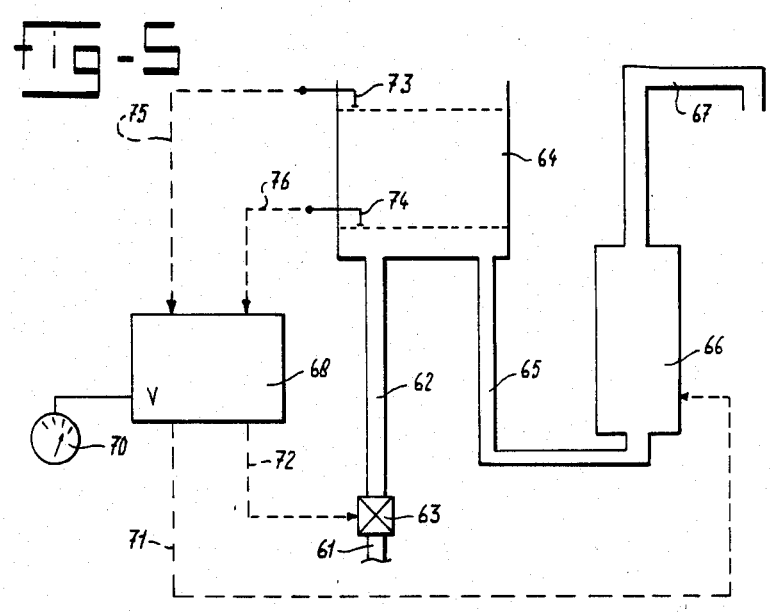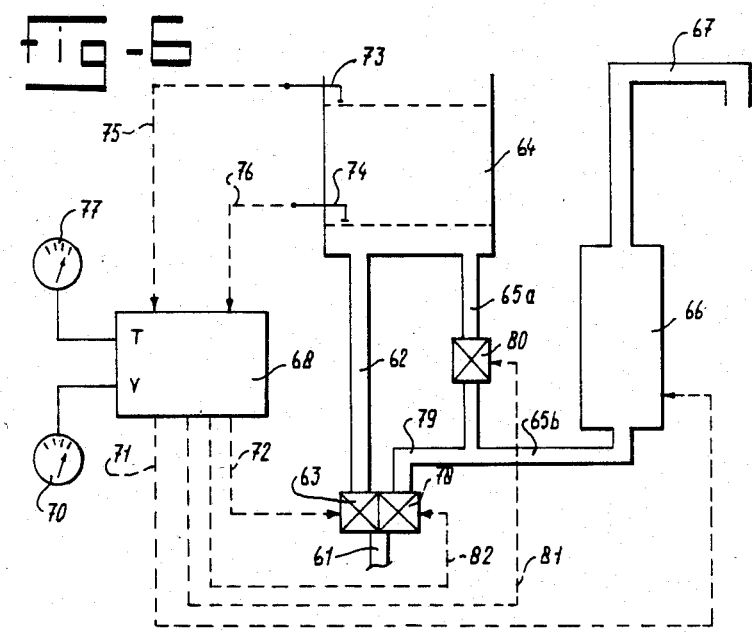

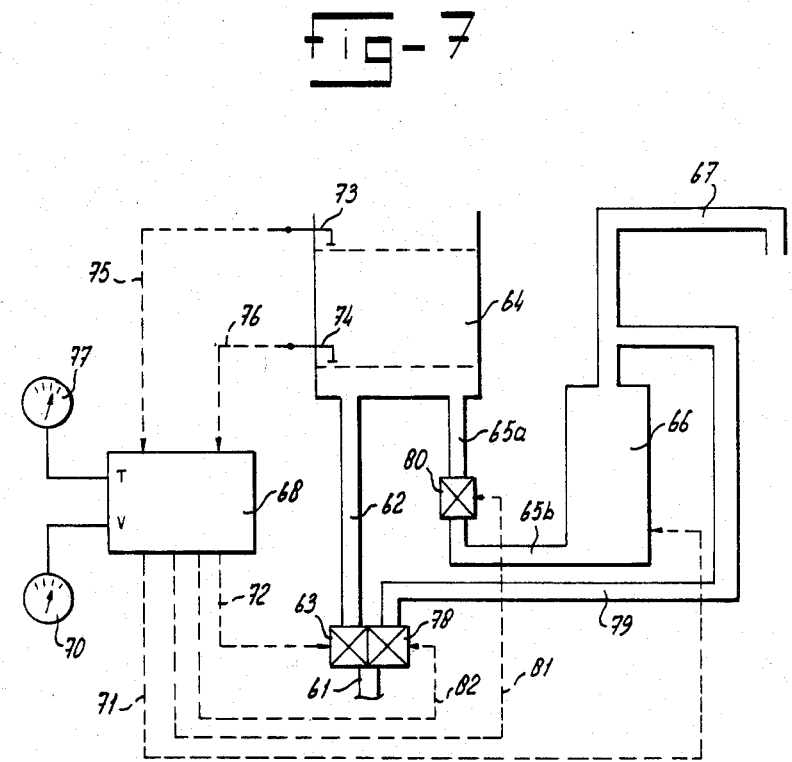

EQUIPMENT FOR SUPPLYING HOT WATER

BACKGROUND OF THE INVENTION

The invention relates to equipment for supplying a quantity of hot water, for example for preparing hot drinks, provided with a heating unit for bringing the quantity of water to a predetermined temperature, the inlet of which is connected via an intake pipe and via an intake valve to a cold water pipe and the outlet of which is connected to a discharge pipe, and provided with a control unit which receives a quantity-selection signal from quantity-selection means and supplies control signals to the intake valve and to the heating unit.

Such a device is known in various versions from the prior art.

In the Dutch Patent Application No. 79.04507, such equipment is described in which the measuring means consist of a turbine meter in the intake pipe. Said turbine meter delivers pulses to the control unit via a pulse generator. In the control unit the pulses are counted and the counter reading is compared with a counter reading related to the quantity-selection signal in order to determine when the intake valve has to be closed.

In the Dutch Patent Application No. 81.03534, such equipment is described in which the measuring means are constructed as a clock which measures the time during which the intake valve is opened. Assuming a steady pressure in the cold water pipe, the quantity of incoming cold water will be related to the period of time in which the intake valve is opened.

In the Dutch Patent Specification No. 158,067 such equipment is furthermore described in which the measuring means consist of a measurement reservoir with level probes fitted therein. The level probes supply signals to the control unit which, in response thereto, opens the intake valve on each occasion for the intake of a quantity of water determined by the level difference between the two probes. The control unit is furthermore constructed in a manner such that the intake valve can be opened and closed a number of times, as a result of which a number of charges of water, which are equal on each occasion, can be supplied.

In all these known types of equipment a flow heating system is used for heating the incoming cold water. Because of the use of a flow heating system, the temperature of the hot water supplied will be about 100° C. Although a slight drop in temperature will occur in the preparation of a hot drink with said hot water, for example during the extraction of coffee extract from ground coffee, the resulting coffee extract will nevertheless still have a fairly high temperature between 85° and 90° C. If said coffee is served in plastic cups, the temperature of the coffee in said cups is generally found to be too high. Not only is there the disadvantage in the case of some plastic cups that the cup itself becomes too hot to hold, but also the temperature of the coffee or tea itself proves too high for it to be possible to drink it immediately. Although the temperature usually drops much more considerably if the drinks are served in earthenware cups, even then the problem often occurs that the coffee served is much too hot.

SUMMARY OF THE INVENTION

The object of the invention is therefore to solve this problem. This object is achieved in equipment of the type mentioned in the introduction in that the equipment is provided with means for supplying a further quantity of water which is not brought to the fixed temperature by the heating unit, which further quantity is dependent on the desired temperature of the total quantity of water to be supplied, and that the equipment is provided with temperature-selection means for selecting the desired temperature, which temperature-selection means supply a temperature-selection signal to the control unit. As a result of a further quantity of water of lower temperature being supplied, the temperature of the total quantity of water supplied drops. Depending on the size of the further quantity of water, a desired final temperature can thereby be reached. The temperature-selection means may be of the type adjustable by the user or of a type which can be set once to a fixed value.

Although the said means for supplying a further quantity of water could consist of a further intake valve, controlled by the control unit and connected to the cold water pipe, and of a pipe running from it which debouches at the same point as the discharge pipe, preference is given to an embodiment in which the said means are provided with a time measuring unit which supplies signals to the control unit in a manner such that the supply of water from the cold water pipe to the discharge pipe is continued for a predetermined period of time after the heating unit has been switched off by the control unit. The resultant equipment is simple in construction. In addition, this embodiment can easily be implemented even in existing equipment.

Preferably, the said means are provided with a temperature selector, to be operated by the user, which, depending on the desired temperature chosen supplies signal to the time measuring unit in order to cause the latter to measure a corresponding period of time. If the temperature selector is adjusted to a relatively low desired temperature, said selector will supply a signal which results in a relatively long period of time being measured. If a relatively high temperature is chosen by means of the selector, the selector will supply a signal which measures a relatively short period of time.

It will be clear that in particular in types of equipment which can supply various adjustable quantities of hot water, a different further quantity of water of lower temperature, which depends on the adjusted quantity of hot water, has also to be supplied in each case to achieve the desired final temperature of the total quantity of water. In order to take account of this, a preferred embodiment of the invention is provided with a memory in which fixed values are stored, which memory is addressed, on the one hand, by a signal supplied by a temperature selector to be set by the user and, on the other hand, is addressed by a signal of the said quantity-selection means, which memory supplies a signal to the time measuring unit in order to cause the latter to measure a corresponding period of time.

BRIEF DESCRIPTION OF THE DRAWINGS

The invention will be described below with reference to exemplary embodiments shown in the figures.

FIG. 1 shows a first exemplary embodiment of equipment according to the invention.

FIG. 2 shows a control unit used in the equipment in FIG. 1.

FIG. 5 shows a known type of equipment for supplying hot water.

FIGS. 6 and 7 show how said type of equipment can be modified in accordance with the invention.

DETAILED DESCRIPTION

Figure 3:
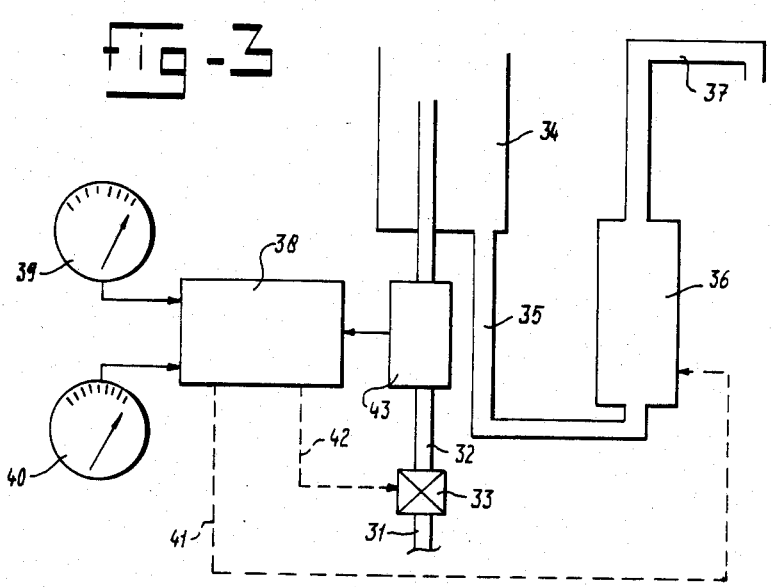
FIG. 3 shows a second exemplary embodiment of equipment according to the invention.

FIG. 1 shows a first embodiment of equipment according to the invention. The equipment is provided with an intake pipe 2 which is connected to a cold water pipe 1 via an intake valve 3. The intake pipe 2 debouches into an overflow tank 4 from which a pipe 5 runs to the inlet side of a flow-type heating unit 6. The outlet side of the flow-type heating unit 6 is connected to a discharge pipe 7 via which the hot water is delivered.

The equipment is further provided with a control unit 8 which supplies signals via a conductor wire 12 to the valve 3 in order to open and close the latter at the correct instants in time and supplies signals via the conductor wire 11 to the heating unit 6 in order to switch the latter on and off at the correct instants in time.

The equipment so far described is known, for example, from the Dutch Patent Application No. 81.03534. A desired volume is set by the user by means of the selection means 10. The control unit 8 receives a signal corresponding to the chosen setting and translates it into a period of time in which the valve 3 must be opened and the heating unit must be switched on. Assuming that the valve 3 and the intake pipe 2 have a constant flow capacity, tee desired volume of cold water will have been delivered after the period fixed by the unit 8 and the valve 3 can be closed. At the same instant in time or after it has been detected that all the cold water has also in fact been delivered as hot water after being heated in the heating unit, the heating unit 6 can be switched off.

According to the invention, further selection means 9 are connected to the control unit 8 with which a desired final temperature of the hot water delivered can be set by the user. The addition of said temperature setting means modifies the operation of the equipment as follows. After the period necessary for delivering the set volume V of hot water has elapsed, the heating unit 6 is switched off. The valve 3, however, still remains opened for a period which is sufficient for delivering an additional quantity of cold water. Although said cold water will run through the heating unit 6, it will at most be heated to some extent therein, allowance being made for the heat-storage capacity of the heating unit. This relatively cold water is added via the discharge pipe 7 to the hot water already supplied, the temperature of which was approximately 100° C. As a result of this, the temperature of the total quantity of water will drop. As more cold water is added, the temperature will drop further.

In the control nit 8, a control signal is generated for closing the tap 3 after a certain period of time has elapsed after the heating unit 6 has been switched off. Said period of time is related to the set desired temperature value.

FIG. 2 shows a more detailed exemplary embodiment of the control unit 8. The unit is provided with a computing processor 20 which receives input signals from a number of measured value transducers or selection means. The measured value transducer 21 detects the temperature of the cold water in the intake pipe 2 or in the mains water pipe 1 and delivers an appropriate signal, eventually after conversion in a suitable converter 23, as TK to the processor 20. The sensor 22 is used to detect the temperature of the hot water $T_H$ in the discharge pipe 7. The selection means 9 are intended for the setting of a desired final temperature $T_G$ by the user and the selection means 10 are intended for the setting of a desired quantity of hot water $V_G$ by the user. The converters 24, 25, and 26 can if necessary be used to convert the signals supplied into a form suitable for the processor 20. The processor 20 computes the period of time in which the heating unit 6 has to be switched on and computes the period of time in which the tap 3 has to be opened. Both calculated periods of time are transmitted to a time control unit 27 which delivers corresponding signals via the line 12 to the tap 3 and delivers corresponding signals via the line 11 to the heating unit 6.

If it is assumed that the heat-storage capacity of the heating unit 6 can be neglected, it will be possible to calculate from the following equation the quantity VE of additional cold water to be delivered (after the desired set quantity $V_G$ has been delivered) to obtain a desired temperature $T_G$ of the total quantity of water delivered:

$$V_E = V_G \frac{T_H - T_G}{T_G - T_K}$$

This computation performed in the processor 20 can be related to a period of time in which the tap must remain open longer. Said period of time is translated into a corresponding control signal by the unit 27.

It will be clear that the transducer 21 and the transducer 22 are not necessary under all conditions. Having regard to the required accuracy of the desired final temperature, it will on the whole be sufficient to set $T_K$ equal to ±6° C. and to set $T_H$ equal to ±100° C. In that case the processor 20 receives only two input signals.

It will further be clear that the processors 20 and 27 can be combined in a single processor.

As a result of adding the extra quantity of relatively cold water, the total quantity of water supplied naturally becomes larger than the quantity which has been selected by means of the selection means 10. If a relatively high desired final temperature is set, the difference will be relatively small. If a relatively low desired final temperature is set, the total quantity of water delivered may be considerably larger than the desired quantity of water delivered. To avoid this, the processor 20 may also be used in a manner such that the processor first of all computes a quantity $V_1$, which quantity is heated to the fixed temperature by the flow-type heating system. Once this quantity has been supplied, the flow-type heating system is switched off by means of the processor 27. However, the supply of water continues until the desired quantity $V_G$ has been supplied, after which the valve 3 is closed by the processor 27. The result of this is that precisely the desired quantity of water $V_G$ is supplied and that the final temperature thereof is the selected temperature $T_G$.

The quantity of water $V_1$ which has to be supplied first of all with the heating system switched on is:

$$V_1 = \frac{T_G - T_K}{T_H - T_K} \cdot V_G$$

A further quantity $V_2$ then has to be supplied with the heating switched off which is equal to:

$$V_2 = \frac{T_H - T_G}{T_H - T_K} \cdot V_G$$

(in this connection it is postulated that the heat capacity of the heating unit has a negligible influence on the final temperature).

FIG. 3 shows a second embodiment of equipment according to the invention. The equipment is provided with an intake pipe 32 which is connected to a cold water pipe 31 via an intake valve 33. The intake pipe 32 debouches into an overflow tank 34 from which a pipe 35 runs to the inlet side of a flow-type heating unit 36. The outlet side of the flow-type heating unit 36 is connected to a discharge pipe 37 through which the hot water is delivered.

The equipment is further provided with a control unit 38 which supplies signals via a conductor wire 42 to the valve 33 in order to open and to close the latter at the correct instants in time, and supplies signals via the conductor wire 41 to the heating unit 36 in order to switch the latter on and off at the correct instants in time. The intake pipe 32 incorporates a turbine meter 43 for measuring the quantity of water flowing through the pipe.

The equipment described so far is known, for example, from the Dutch Patent Application No. 79.04507. A desired volume is set by the user by means of the selection means 40. In the control unit 38, a signal is received which corresponds to the selected setting and compared with the signal from the turbine meter. If tee signal from the turbine meter indicates that the desired quantity has been delivered, the valve 33 is closed. At the same instant in time or after it has been detected that all the cold water has also in fact been heated and delivered as hot water, the heating unit 36 can be switched off.

According to the invention, further selection means 39 are connected to the control unit 38 with which a desired final temperature of the hot water delivered can be set by the user. As a result of adding these temperature setting means, the operation of the equipment is modified as follows in a manner similar to the embodiment in FIG. 1. After the period necessary for supplying the set volume V of hot water has elapsed, the heating unit 36 is switched off. However, the valve 33 still remains opened for a period which is sufficient for delivering an additional quantity of cold water. Although this cold water will flow through the heating unit 6, it is at most heated a little therein, account being taken of the heat-storage capacity of the heating unit. This relatively cold water is added via the discharge pipe 37 to the hot water already delivered whose temperature was approximately 100°. As a result of this the temperature of the total quantity of water will drop. As more cold water is added, the temperature will drop further.

In the control unit 38 a control signal is generated for closing the tap 33 when a certain period of time has elapsed after the heating unit 36 has been switched off. This period of time is related to the set desired temperature value.

Figure 4:
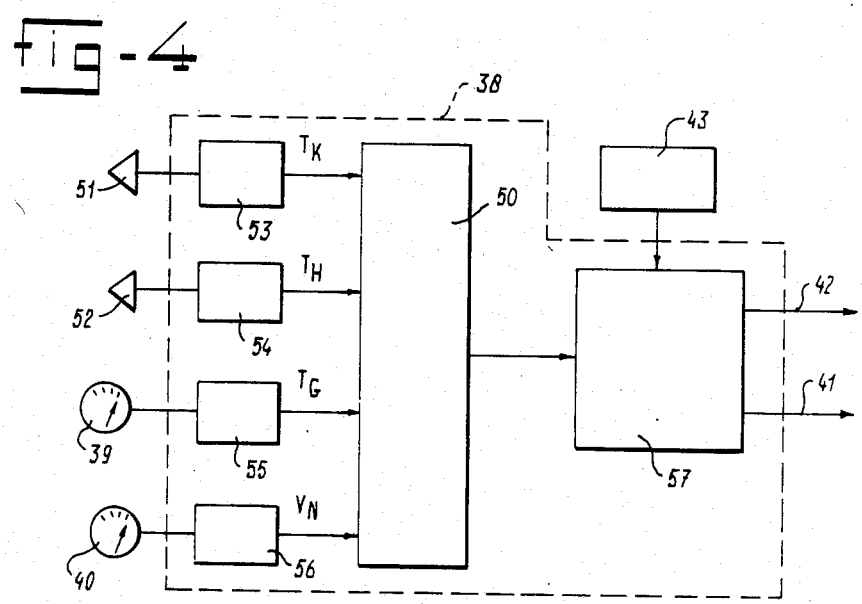
FIG. 4 shows a control unit used in the equipment in FIG. 3.

FIG. 4 shows a detailed exemplary embodiment of a control unit 38. The unit is provided with a computing processor 50 which receives input signals from a number of measured value transducers and selection means respectively. The measured value transducer 51 detects the temperature of the cold water in the intake pipe 32 or in the mains water pipe 31 and delivers an appropriate signal, optionally after conversion in a suitable converter 53, as $T_K$ to the processor 50. The sensor 32 is used to detect the temperature of the hot water $T_H$ in the discharge pipe 37. The selection means 39 are intended for the setting of a desired final temperature $T_G$ by the user and the selection means 40 are intended for the setting of a desired quantity of hot water $V_G$ by the user. The converters 54, 55, 56 can, if necessary, be used to convert the signals supplied into a form suitable for the processor 50. The turbine meter 43 supplies a measurement signal to the processor 57. The quantity $V_E$ of cold water to be delivered additionally in order to obtain a desired temperature $T_G$ of the total quantity of water supplied, is again calculated by the processor 50 in the manner already discussed above. The processor 57 now controls the heating unit 36 and the tap 33 via the conductor wires 41 and 42 on the basis of the data received from the processor 50 and from the turbine meter 43 again in a manner such that the final temperature of the water supplied is equal to $T_G$. In addition, it is also possible to ensure in the manner specified above that the volume of the total quantity of water supplied is equal to $V_G$ by computing the volumes $V_1$ and $V_2$ mentioned above of the processor 50 and comparing the signals corresponding thereto in the processor 57 with the measurement signal from the turbine meter 43.

FIG. 5 shows equipment as is known from the Dutch Patent Specification No. 158,067, and FIG. 6 shows the manner on which said known equipment can be modified in accordance with the invention. In FIGS. 5 and 6 the same reference numerals are used for corresponding components.

The known equipment shown in FIG. 5 embodies an intake pipe 62 which is connected via an intake valve 63 to a cold water pipe 61. The intake pipe 62 debouches into a measuring reservoir 64, from which a pipe 65 runs to the inlet side of a flow-type heating unit 66. The outlet side of the flow-type heating unit 66 is connected to a discharge pipe 67 through which the hot water is delivered.

The equipment is further provided with a control unit 68 which supplies signals via a conductor wire 72 to the valve 63 in order to open and close the latter at the correct instants in time, and supplies signals via the conductor wire 71 to the heating unit 66 in order to switch the latter on and off at the correct instants in time. Via the conductor wires 75 and 76 the control unit 68 receives signals from the level probes 73 and 74 which are used to measure a charge, the volume of which is determined by the levels at which the respective probes 73 and 74 and positioned. The number of charges which are processed by the equipment can be selected by means of the selection means 70.

FIG. 6 shows a version of this known equipment modified in accordance with the present invention. In addition to the intake valve 63, a further intake valve 78 is connected to the cold water pipe 61. At the same time the pipe 65 is divided into two parts indicated by 65a and 65b by a further valve 80. A pipe 79 is fitted between the further intake valve 78 and the pipe 65b. The further intake valve 78 is controlled by the control unit 68 via the conductor wire 82, and the valve 80 is controlled by the control unit 68 via conductor wire 81. In addition, the control unit 68 receives a temperature signal from the temperature setting means 77 with which a desired final temperature can be set by the user.

After the equipment is switched on, the control unit 68 will open the valve 63 until the probe 73 indicates that the water in the reservoir 64 has reached the highest level. Then the valve 63 is closed and the heating unit 66 is switched on so that the water is heated and hot water is delivered via the pipe 67. This process continues until the probe 74 indicates that the water in the reservoir 64 has dropped to the lowest level. Depending on the selected number of charges, this process may now be repeated a number of times so that a preselected quantity of water can be supplied in discrete steps.

In the equipment shown in FIG. 6, the tap 63 will be closed and the heating system 66 will be switched off when the last charge is complete and the probe 74 indicates that the water level in the reservoir 64 has dropped to the lowest level. Then the control unit 68 closes the tap 80 via the conductor wire 81 and opens the valve 78 by means of a signal on the conductor wire 82. The result of this is that cold water from the cold water pipe 61 will start to flow through the heating unit 66, which is now switched off, via the valve 78, the pipe 79 and the pipe 65b and is delivered via the pipe 67. The control unit 68 again computes in the manner now already discussed how long the valve 78 must remain opened in order to supply an additional quantity of water in a manner such that the final temperature $T_G$, selected by means of the selection means 77, of the total quantity of water supplied is reached After the computed period of time has elapsed, the valve 78 is closed and the valve 80 is opened so that the equipment is ready for a subsequent delivery procedure.

In this exemplary embodiment, too, the control unit 68 may be equipped in a manner such that, on the basis of the set desired final temperature $T_G$ and on the basis of the selected number of charges corresponding to a fixed quantity $V_G$, a computation is carried out in it of how much cold water $V_E$ must be delivered in addition and how long the valve 78 must be opened (and the valve 80 closed) to supply said additional quantity.

Should the total quantity of water delivered become excessively large as a result (if the desired and final temperature is relatively low), the quantity of water which is heated by the heating unit 66 can also be reduced in this case by omitting one or more o the set number of charges from the cycle. If, for example, five charges and a relatively low final temperature have been selected, for which the processor may compute that an additional quantity of water would be necessary which is approximately equal to one charge, the control unit 68 can control the equipment in a manner such that four charges of hot water are supplied and then a quantity of cold water such that the desired final temperature is reached. The result of this will be a total quantity of water supplied having the desired final temperature $T_G$ and a volume which, at least to a good approximation, is equal to or somewhat larger than the set volume $V_G$.

In many cases the user will not place high requirements for facilities for continuously varying the temperature on such equipment but will only be interested in a number of selection steps, for example a desired final temperature which can be set to 80°, 75°, 70°, 65°, 60°, and 55° C. In particular, in combination with equipment operating on a charge bass, it is preferable to provide a read-out memory of the ROM type in the control unit 68, which memory is addressed, on the one hand, by the signal from the charge selection means 70 and, on the other hand, by the stepwise operating temperature selection means 77, and deliver at its output signals which indicate, on the one hand, how many charges of hot water are supplied and, on the other hand, how much additional cold water has to be added thereto in order finally to supply a quantity of hot water having the desired final temperature $T_G$ and, at least approximately, the desired volume $V_G$.

In relation to the embodiment which is shown in FIG. 6 it should be noted that the valves 63 and 78 do not need to be embodied as separate valves but may also be combined as a so-called three-way valve. This valve can then be controlled via one single conducting wire with a signal which has been adapted to it. The valve 80 does not need to be embodied as a controllable valve either, but may be replaced by a so-called nonreturn valve which reverts to the blocking state as soon as the pressure in the pipe 65b becomes larger than that in the pipe 65a.

FIG. 7 snows a further embodiment of the equipment according to the invention. This embodiment is for the larger part identical to the embodiment illustrated in FIG. 6. Therefore the same reference numbers are used for corresponding parts of the shown equipment. The only actual difference resides in the position of the cold water pipe 79, which is not running between the further intake valve 78 and the pipe section 65b as illustrated in FIG. 6, but is instead thereof running between the further intake valve 78 and the discharge pipe 77. The advantage of this embodiment is that the further quantity of cold water delivered via the further intake valve 78 and the pipe 79 does not flow through tee flow heater 66 so that the temperature of the further quantity of water is maintained at the fairly constant low level of ±6° C. (the water temperature in the mains water pipe system). As result thereof the functioning of the control unit 68 can be more accurate or the same accuracy can be obtained by carrying out only some simple computations.

I claim:

1. Apparatus for supplying hot water for preparing hot drinks, comprising:

a heating unit, provided with an inlet for cold water and an outlet for hot water, for heating a predetermined volume of water to a predetermined temperature;

an intake pipe, one end of which is connected to said inlet of the heating unit and the other end of which is connected to a water supply line, for supplying water to said heating unit;

a first intake valve installed in said intake pipe for controlling the flow of fluid therethrough;

a discharge pipe connected to the outlet of said heating unit for discharging water;

a control unit for supplying control signals to both the heating unit and to the first intake valve;

quantity of water selection means for selecting a quantity of water and delivering a signal corresponding to the selected quantity to said control unit;

temperature of water selection means for a selecting temperature of water corresponding to a desired end temperature of the heated water, and delivering a signal corresponding to the selected temperature to said control unit;

said control unit controlling the heater unit and the first intake valve so that a first proportionate volume of hot water having a high temperature is supplied from said heater unit through said discharge pipe, and, after switching off said heater unit, a second proportionate volume of cold water is delivered through said discharge pipe to obtain said selected quantity of water having said desired end temperature.

2. Apparatus according to claim 1, wherein:
said temperature of water selection means is provided with a time measuring unit whit which signals are supplied to the control unit in a manner such that the supply of water from the cold water pipe to the discharge pipe is continued for a predetermined period of time after the heating unit has been switched off by the control unit.

3. Apparatus according to claim 1, further comprising:
quantity measuring means in the intake pipe for measuring the quantity of water flowing through the intake pipe, said quantity-measuring means delivering a measurement signal to the control unit so that said control unit, on the basis of said measurement signal, continues the supply of water from the cold water pipe to the discharge pipe until the measurement signal indicates that the selected quantity of water has been delivered.

4. Apparatus according to claim 1, further comprising:
quantity of water charge measurement means in the intake pipe in discrete charges, said charge-measuring means measuring at least a part of the second proportionate quantity of water.

5. Apparatus according to claim 1, further comprising:
memory means in which fixed values are stored, said memory means being addressed by a signal from the temperature of water selection means and also addressed by a signal from said quantity of water selection means, said memory means delivering a signal which represents said second proportionate quantity of water to be delivered.

6. Apparatus according to claim 1, wherein:
said control unit determines, on the basis of the quantity of water selection signal, the temperature of water selection signal, and also measured or fixed values for the temperature of the water from the cold water pipe, a value of said first proportionate quantity of water, said first proportionate quantity being heated to a fixed temperature, said control unit then determining the value of the second proportionate quantity of water which second proportionate quantity is not brought to the fixed temperature by the heating unit, the sum of the first proportionate quantity and the second proportionate quantity being equal to the selected quantity at the selected temperature.

7. Apparatus according to claim 1, further comprising:
a by-pass pipe connected between a second intake valve connected to the cold water pipe and the inlet of the heating unit, a valve also being provided in the intake pipe between the inlet of the heating unit and the quantity measuring means.

8. Apparatus according to claim 3, further comprising:
a by-pass pipe connected between a second intake valve connected to the cold water pipe and the discharge pipe, a valve also being provided in the intake pipe between the input of the heating unit and the quantity measuring means.

9. apparatus according to claim 8, wherein:
said valve in the intake pipe between the inlet of the heating unit and the quantity measuring means is controlled by the control unit in a manner such that it is closed when the heating unit is switched off.

10. Apparatus according to claim 9, wherein:
said valve in the intake pipe between the heating unit and the quantity measuring means is a non-return valve.

11. Apparatus as in claim 10, wherein:
the first and second intake valves connected to the cold water pipe are combined as one single multiway valve with one input and two outputs.

* * * * *